United States Patent [19]

Hyler et al.

[11] 4,207,691
[45] Jun. 17, 1980

[54] FOUR-WHEEL DRIVE SCRAPER WITH MAIN PROPULSION AT REAR AXLE

[75] Inventors: John H. Hyler, Peoria; Walter E. Lott, Washington; Clifford E. Johnson, Peoria, all of Ill.

[73] Assignee: Westinghouse Air Brake Company, Pittsburgh, Pa.

[21] Appl. No.: 962,392

[22] Filed: Nov. 20, 1978

[51] Int. Cl.² .................... E02F 5/00; B60K 17/34
[52] U.S. Cl. .............................. 37/124; 180/14 A; 180/243
[58] Field of Search .................... 37/124–129, 37/8, DIG. 1; 180/77 R, 70 R, 54 R, 54 C, 14 A, 49, 105 R, 105 E

[56] References Cited

U.S. PATENT DOCUMENTS

| | | | |
|---|---|---|---|
| 3,263,767 | 8/1966 | Rockwell | 37/124 X |
| 3,612,202 | 10/1971 | Moon, Jr. | 180/14 A |
| 3,804,191 | 4/1974 | Golan et al. | 37/124 X |
| 3,981,374 | 9/1976 | Johns, Jr. | 180/14 A |
| 4,063,361 | 12/1977 | Hyler et al. | 37/129 |

Primary Examiner—E. H. Eickholt
Attorney, Agent, or Firm—Leydig, Voit, Osann, Mayer & Holt, Ltd.

[57] ABSTRACT

An off-highway earth-moving vehicle of the scraper type which includes a tractor section and scraper section interconnected by a draft frame providing rolling rigidity, each section having a pair of ground-engaging wheels. A floating axle assembly is provided on the tractor section permitting independent movement of the tractor wheels in the following of ground contours. The scraper section is driven by a prime mover having a torque converter for coupling to the rear axle. The prime mover, in addition, drives an AC synchronous generator which is electrically connected to an induction motor in the tractor section. The motor in turn is drivingly coupled, via a second torque converter, to the tractor wheels. The sections of the vehicle are so proportioned in size and weight that the weight applied to the scraper wheels under both loaded and unloaded conditions is approximately twice the weight applied to the tractor wheels and the drive systems in the sections are so proportioned that at normal operating engine r.p.m. the power supplied to the scraper wheels is approximately twice the power provided by the motor to the tractor wheels. This is preferably accomplished by using torque converters having respective maximum horsepower output ratings at an input speed corresponding to normal operating prime mover r.p.m. which substantially total the maximum rated horsepower produced at such r.p.m. and which bear a ratio to one another on the general order of 2:1.

9 Claims, 16 Drawing Figures

NOTE: MAXIMUM HORSEPOWER RATINGS OF TORQUE CONVERTERS 52, 111

(a) HAVE TOTAL WHICH IS SUBSTANTIALLY EQUAL TO RATED ENGINE HORSEPOWER AT NORMAL OPERATING SPEED OF ENGINE AND, (b) ARE IN RATIO OF 1:2 TO ONE ANOTHER

Fig. 13.
STABILITY DIAGRAM ~ DISCLOSED SCRAPER ~ EMPTY

Fig. 14.
STABILITY DIAGRAM ~ CONVENTIONAL SCRAPER ~ EMPTY

Fig. 15.
STABILITY DIAGRAM ~ DISCLOSED SCRAPER ~ LOADED

Fig. 16.
STABILITY DIAGRAM ~ CONVENTIONAL SCRAPER ~ LOADED

FOUR-WHEEL DRIVE SCRAPER WITH MAIN PROPULSION AT REAR AXLE

BACKGROUND OF THE INVENTION

It has been a practice in the past, in powering a two-axle, four-wheel drive earth-moving scraper, to provide engines close-coupled to the respective axles, using a larger engine in the forward position. This has been true of both push-loaded scrapers and elevator type scrapers. Further it has been conventional to employ articulated or wagon type steering at the front axle, with maximum steering angles of approximately 90 degrees to either right or left and with transverse oscillation of a front axle and cab through a range of about 20 degrees each way from level. Because of the concentration of power at the front axle, large front tires have been necessary. This has required the gooseneck of the draft frame to be arched high enough to clear the tires for any combination of steering angle and oscillation. Moreover, because of the large tires, it has been necessary to place the bowl of the scraper sufficiently to the rear of the front tires to insure clearance under all conditions. Because of the necessary clearance geometry and concentration of power in the tractor, prior tractors have been relatively large and heavy, having a height significantly greater than the height of the scraper section.

The use of a large engine in the tractor immediately adjacent to, and often somewhat ahead of, the operator's position makes his environment less than ideal. Noise and vibration as well as heat and fumes all tend to be at a high level, arising not only from the engine but from its ancillaries such as radiator and exhaust system. Forward driving visibility is reduced. The large front tires place the operator at a greater height above the ground which aggravates the severe rolling experienced by the operator as he oscillates transversely, along with the front axle, over rough terrain.

In addition the use of a large tractor section at the front of the vehicle tends to make the vehicle unstable, particularly at steering angles near the maximum where the rear wheels are the only major stabilizing means which must be relied upon to balance the front axle forces. Such instability is particularly great when the vehicle travels empty, and often at high speed, back to pick up a new load. Following prior practices there is considerable risk of overturning when traversing rough terrain.

Prior practices can, in addition, be shown to be economically disadvantageous. Constructing a tractor having high power capability with large tires and resulting large values of clearance geometry require all load-carrying elements to be of similar scale. The gooseneck and draft frame must not only be capable of withstanding a heavy load, but, because of the required increased span, such elements must be capable of accommodating loading applied at increased moment arms, which requires still further reinforcement. The resulting increase in weight necessary in the empty vehicle subtracts from the rated load capability within the gross weight capability of the vehicle, so that operating cost per delivered cubic yard is increased. In addition the dynamic stresses imposed upon both the operator and the vehicle tend to reduce operating speed and scraper productivity.

Closely related to the above is the fact that prior techniques result in poor "cubics", that is, the volume of earth which can be moved measured as a fraction of the volume occupied by the vehicle itself. This is due to the size and height of the tractor as compared to the size and height of the scraper bowl, which is not only a disadvantage during operation but also during shipment, storage and shop maintenance.

The use of two engines to accomplish a four-wheel drive has the following disadvantages: The reliability of the vehicle is reduced since two engines are susceptible to failure, and failure of either one of them puts the vehicle out of commission. Moreover, with two engines, two sets of ancillary equipment must be provided such as air cleaners, oil filters, exhaust systems, fans and radiators, and service checks and major repair must be performed for each. Relatively large spaces must be provided both on the tractor and trailer to accommodate two engines, their vibration mountings, enclosures and ancillaries.

It has been suggested in the past that the rear axle might be driven electrically. This has been found to be disadvantageous, however, because of low efficiency and since induction motors providing only a single speed approximately in low gear at the front drive have not offered good vehicle performance at higher speed. Efforts to improve performance by providing for a second motor speed has been at the expense of considerable investment in switchgear, with reduced reliability due to that switchgear. Even so the motor has been required to operate a good deal of the time under conditions of high slippage, resulting in overheating and possible damage. These problems are aggravated in climbing a grade due to the weight shift from the front axle to the rear of the vehicle.

Efforts have also been made to provide electrical propulsion in the driving of all four wheels, but this has been found to be disadvantageous since electrical propulsion systems have tended to be larger, heavier and more costly than mechanical drives. Moreover, electrical propulsion systems tend to be limited in the speed and torque ranges over which they can transmit full horsepower, and, because of the reduced efficiency inherent in an electric drive, total availability propulsion horsepower is reduced.

The above comments apply to scrapers in general. In the case of elevator type scrapers, power being provided from the front engine, difficulty has been experienced in coordinating elevator speed and performance with the propulsion speed and tractive effort, to keep the elevator from being overloaded and to avoid spinning and rapid wear of tires while maintaining reasonable efficiency.

SUMMARY AND OBJECTS OF THE INVENTION

It is, accordingly, an object of the present invention to provide an off-highway earth-moving vehicle of the scraper type having driven front and rear axles including a tractor section and a scraper section which are so proportioned in size and weight that the weight applied to the scraper wheels under both loaded and unloaded conditions is approximately twice the weight applied to the tractor wheels, and with the drive systems being so proportioned that the power applied to the scraper wheels is approximately twice the power applied to the tractor wheels.

It is a related object to provide, in a vehicle of the above type, a tractor section of relatively smaller size and weight in which, for a given capacity, the tires, axles, suspension, chassis, oscillation arrangement, articulated steering, gooseneck and draft frame are all scaled down in size and weight so that the front axle carries approximately one-third, and the rear axle two-thirds, of the total axle loading in both the empty and full conditions, with a single prime mover located at the rear axle supplying power to both axles substantially in proportion to the weight which they bear.

It is a more specific object of the invention in its preferred form to provide a scraper vehicle having a single prime mover at the scraper axle, which, in addition to driving the axle, drives an AC synchronous generator which is interconnected, via power transmission lines, to an induction motor located at the tractor axle, with the drive system for the train axle being scaled to provide approximately one-third of the total driving horsepower.

It is another object of the invention to provide a scraper vehicle of the above type in which the tractor section is provided with an axle assembly which is floatingly supported with respect to the tractor section to permit independent movement of the assembly in the following of ground contours, while the tractor itself has rolling rigidity with respect to the scraper.

It is still another object of the invention to provide an earth-moving vehicle of the scraper type in which the operator's environment is greatly improved by a substantial reduction in noise, vibration, heat and fumes combined with improved forward visibility. In addition, roll disturbances for the operator are reduced because he is placed in a lower position closer to the roll center and since the operator no longer oscillates with the front axle.

It is yet another object to provide an earth-moving vehicle of the scraper type in which the tractor section, being of relatively reduced size for a given vehicle rating, may be more readily and economically serviced and maintained.

It is another object of the invention to provide an off-highway earth-moving vehicle of the scraper type which, in addition to improvement in operating efficiency, presents an improved functional appearance, with the large tires and single large engine being positioned at the rear, at the load position, the relatively small and trim tractor section of reduced height at the front resulting in an integrated package of substantially constant height having improved "cubics", that is, maximum compactness for the size of the load being transported.

It is a related and important object to provide a tractor in which the size of the front tires is at a practical minimum for a given vehicle capacity, thereby reducing the required clearance dimensions and enabling the use of a gooseneck of minimum height and span and enabling the wheel base and overall length of the vehicle to be decreased.

It is still another object of the invention to provide an off-highway earth-moving vehicle in which the weight is concentrated at the rear wheels and which has substantially better stability, that is to say, margin of safety against the hazard of overturning when making a sharp turn in rough terrain, with stability being enhanced both in the empty and loaded conditions.

It is yet another object of the invention to provide an off-highway earth-moving vehicle which has a high degree of economy both in first cost and in operating cost for the amount of work accomplished. Reduction in initial cost is brought about primarily by reduction in size of the tractor elements including chassis, front axle and tires, oscillation arrangement, suspension system, articulated steering, gooseneck and draft frame, all of which elements are relatively expensive, accompanied by a scaling up in size of the rear axle, stationary rear tires and rear engine which can be accomplished at relatively reduced cost. The scaling down in size of the tractor draft frame and gooseneck brings about a double benefit—the spans and moments are reduced, permitting a further reduction in working cross section.

It is yet another object of the invention in one of its aspects to provide a drive system which includes a generator of the synchronous alternating type coupled directly to the prime mover and which is permanently connected, by electrical transmission lines, to an AC induction motor at the tractor wheels, with automatic means being provided to vary the exitation of the generator so that power transmitted to the tractor wheels is continuously maintained at a level of approximately half that which is transmitted to the scraper wheels.

It is an object of the invention in its preferred embodiment to provide a drive system capable of securing the above features and advantages but which is highly simplified, being free of any need for power measuring means or for a control loop. Specifically, it is an object to provide a drive system which employs a synchronous link between a prime mover and generator and the scraper and the motor in the tractor, with the prime mover and motor being coupled to the rear and front axles by respective torque converters, the torque converters having maximum horsepower output ratings for a normal operating prime mover r.p.m. which substantially total the maximum rated horsepower produced at such r.p.m. and which bear a ratio to one another on the general order of 2:1.

It is an object of the invention in one of its aspects to provide an earth-moving vehicle of the scraper type which employs a synchronous link in the form of a positive displacement hydraulic pump and motor drive.

Also in accordance with one of the aspects of the invention, a propulsion system is provided which is particularly well suited for use in an elevator type scraper in which the elevator motor, of the induction type, is connected to the generator output terminals without affecting the connections to the motor in the tractor.

Other objects and advantages of the invention will become apparent upon reading the attached detailed description and upon reference to the drawings in which:

While the invention has been described in connection with certain preferred embodiments, it will be understood that we do not intend to be limited to the particular embodiments shown but intend, on the contrary, to cover the various alternative and equivalent constructions included within the spirit and scope of the appended claims.

DETAILED DESCRIPTION OF THE PREFERRED EMBODIMENT

Figure 1:
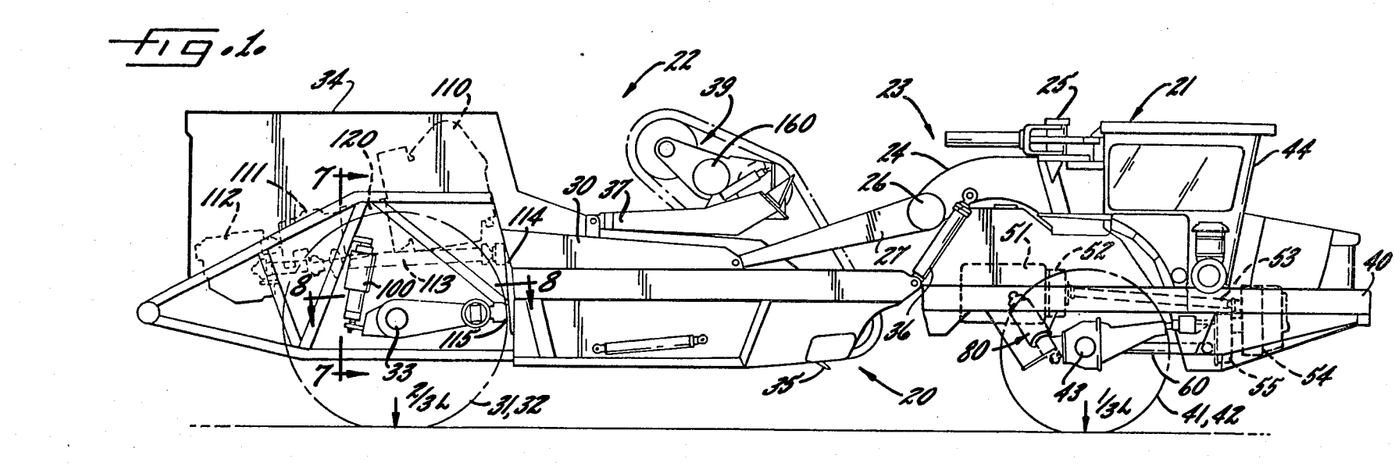
FIG. 1 is a general side elevation of an off-highway earth-moving vehicle of the scraper type including a tractor section and a scraper section employing the features of the present invention.
Figure 2:
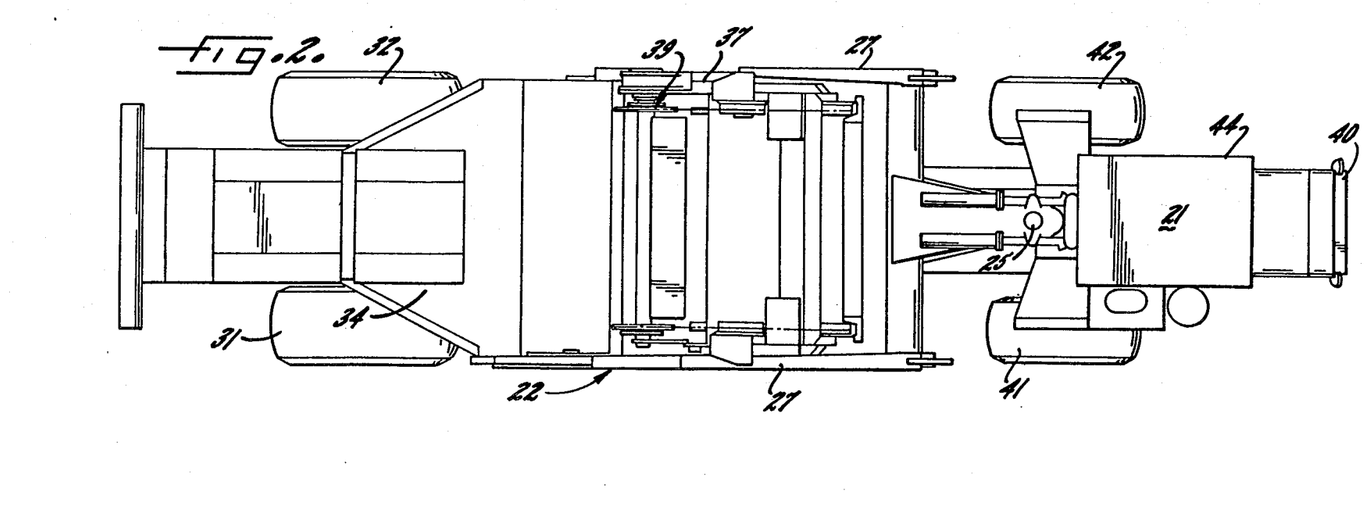
FIG. 2 is a plan view of the vehicle disclosed in FIG. 1.

Referring now to the drawings, there is disclosed in FIGS. 1 and 2 an off-highway vehicle in the form of a tractor drawn scraper 20 having a tractor section 21 and a bowl or scraper section 22, the sections being interconnected by a draft frame 23 providing rolling rigidity between the bowl and the tractor. The draft frame includes a so-called gooseneck 24 which is of rigid construction pivoted to the tractor assembly 25 for horizontal swinging (steering) movement and carrying a yoke tube 26 to the lateral ends of which are rigidly secured draft members 27, one on each side of the bowl.

The bowl, indicated at 30, is supported upon scraper section wheels 31, 32 on an axle 33. In the region between, and largely above, the wheels, there is a drive housing 34 containing an engine and drive train to which reference will later be made. At the front of the bowl 30 is a transversely extending digger blade 35. A pair of bowl actuators 36 are connected between the front end of the bowl and the gooseneck 24, the actuators being capable, upon elongation, of rocking the scraper section 22 downwardly about its supporting wheels so that the blade 35 is in scraping engagement with the ground. The earth which is loosened by the blade is elevated and deposited at the rear of the bowl by means of a power driven elevator 39 which is supported upon a pair of arms 37.

Figure 3:
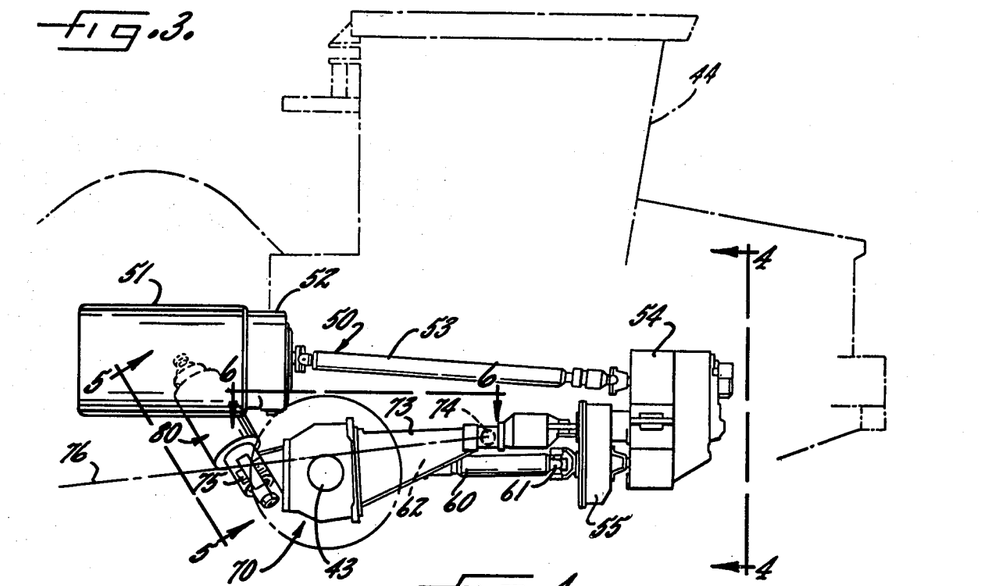
FIG. 3 is an elevational view similar to FIG. 1 but limited to elements of the tractor drive train.

Turning attention to the tractor section 21, it includes a frame 40 supported by a pair of ground engaging wheels 41, 42 on an axle 43 and carrying a cab 44. The wheels 41, 42 are driven by a drive train 50 (FIG. 3) which includes a motor 51 at the rear of the tractor section, a close-coupled torque converter 52, an intermediate drive shaft 53, a transmission 54 which is located at the front of the tractor and which has a clutch housing 55 secured to its rear surface. Leading rearwardly from the clutch housing is a main drive shaft 60 having a first universal joint 61 and a second universal joint 62.

Figures 4, 5:
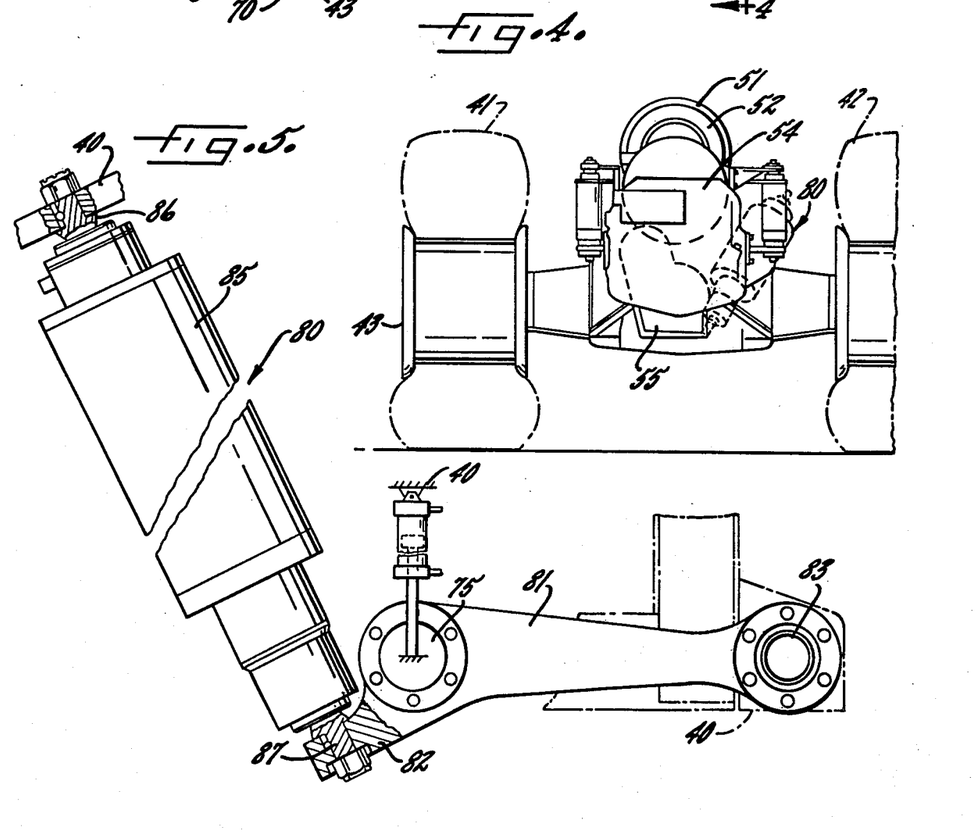
FIG. 4 is a front elevational view of the drive train looking along line 4—4 in FIG. 3.
FIG. 5 is a fragmentary view showing the spring suspension device for the axle assembly looking along line 5—5 in FIG. 3

In carrying out the present invention we provide a tractor axle assembly 70 (FIG. 6) having an axle housing 71 which supports the axle 43 and which is enlarged at its center to accommodate a differential mechanism 72 coupled to the rear universal joint 62. Rigidly secured to the axle housing and projecting forwardly thereof in a centered position is a tongue 73 having a pivot connection with the tractor frame 40 in the form of a ball and socket connection 74. The tongue 73, it will be noted, is divergent, or V-shaped, and extends downwardly at a slight angle, as well as rearwardly, so as to straddle the drive shaft 60. Located to the rear of the axle housing 71, and in centered position, is a second pivot connection 75, the two pivot connections defining a roll axis 76 providing relative tilting movement of the axle assembly with respect to the tractor frame. A spring suspension device 80 (see especially FIG. 5) is interposed between the tractor frame 40 and the rear pivot connection 75 on the axle assembly. The suspension includes a panhard type link having a horizontal arm 81 and a downwardly angled arm 82. The horizontal arm 81 extends from the pivot connection 75 on the axle housing to a pivot connection 83 along one side of the tractor frame 40. Interposed between the angled arm 82 of the panhard link and the tractor frame 40 is a spring in the form of an air/oil suspension device 85 having an upper connection 86 and a lower connection 87. The horizontal arm portion 81 of the panhard link serves as a radius rod to keep the axle housing 70 constantly centered with respect to the tractor while accommodating vertical movement of the axle assembly as well as rolling movement about the roll axis 76.

Figures 6, 7, 8, 9:
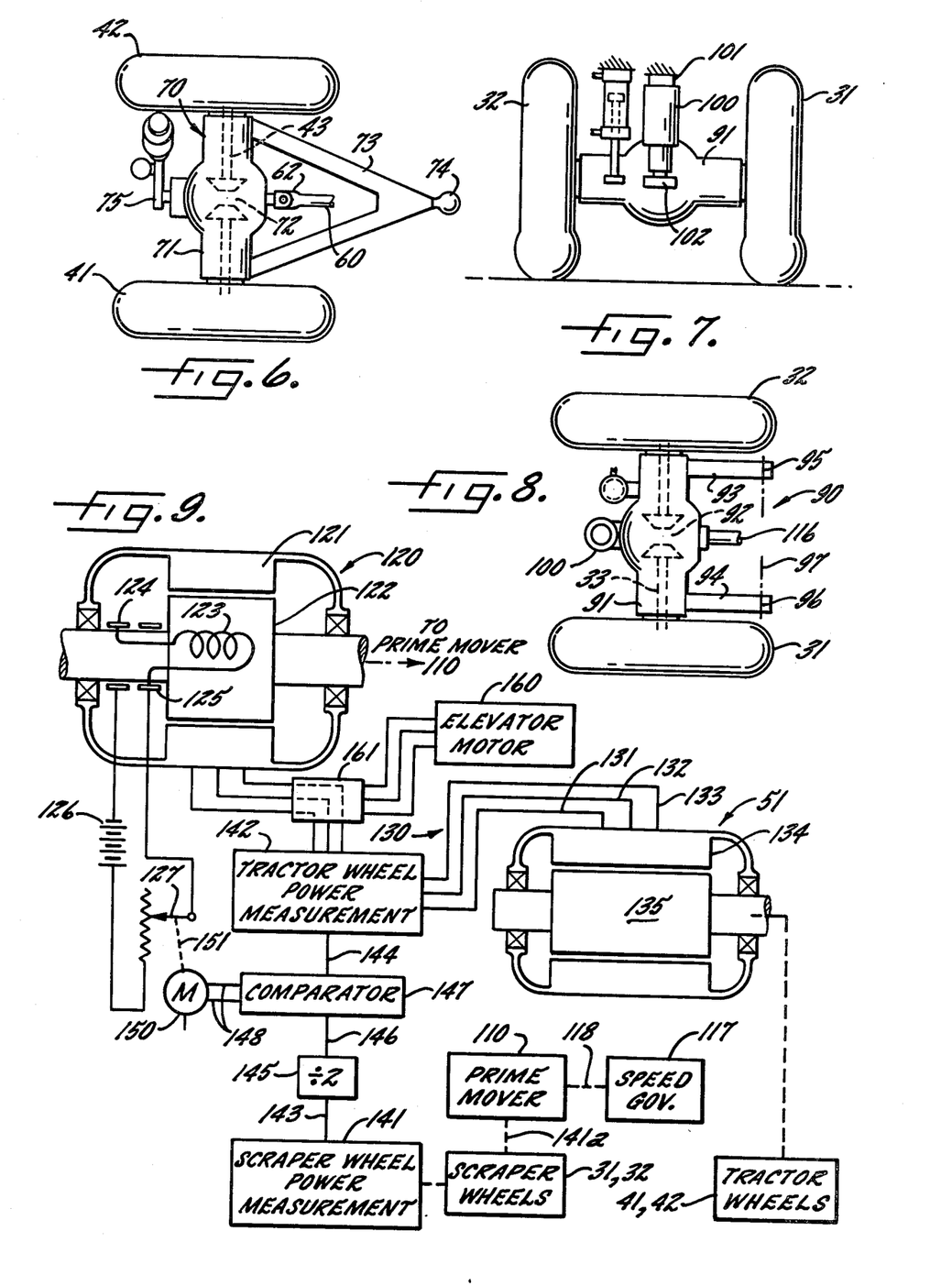
FIG. 6 is a plan view of the tractor axle assembly looking along line 6—6 in FIG. 3.
FIG. 7 is a rear elevational view of the suspension for the scraper section of the vehicle looking along 7—7 in FIG. 1.
FIG. 8 is a plan view of the scraper section, axle assembly looking along line 8—8 in FIG. 1.
FIG. 9 is an electrical diagram showing the AC link and means for automatic control of exitation.

In contrast to the tractor section, the trailing section is supported by wheels which are non-rolling about a fore-and-aft axis. Specifically, and referring to FIGS. 1, 7 and 8, the wheels 31, 32 of the scraper section, and their axle 33, are supported upon a trailer axle assembly 90 having an axle housng 91 which is enlarged at its center to accommodate a differential 92. Extending forwardly from the axle housing and rigidly secured to it are a pair of laterally spaced tongues 93, 94 which are connected to the bowl structure at laterally spaced pivot connections 95, 96, providing up and down swinging movement of the axle assembly about a transversely extending axis 97. For springing of the wheels of the scraper section, a spring suspension device 100 is provided having an upper connection 101 with the bowl structure and a lower connection 102 with the axle housing 91. (FIG. 7). The wheels 31, 32 are thus free to swing upwardly and downwardly in unison with one another, with the motion cushioned by the spring suspension device 100.

The rear or "scraper" drive train includes an engine 110 (see FIG. 1) at the rear end of the scraper section connected by torque converter 111 to transfer box 112. Projecting forwardly from the latter is an intermediate drive shaft 113 which feeds a second transfer box 114 having an output 115 coupled to a rearwardly extending drive shaft 116 which drives the differential 92 (FIG. 8) previously referred to. The prime mover is under the control of a known type of speed governor 117 to which it is coupled by a control connection 118 for maintaining a normal operating r.p.m., the prime mover having a maximum rated horsepower corresponding to such r.p.m. In the case of a large diesel unit the normal operating speed may be on the order of 2000 r.p.m.

Since the laterally spaced tongues 93,94 of the scraper section axle assembly preclude relative rolling movement of the trailer wheels about a fore-and-aft axis, the wheels are constrained to bear a constant "roll" relationship to the bowl, thereby determining the lateral tilt relationship of the scraper blade 35 with respect to the ground. Also because of the combined rolling rigidity between the scraper section wheels 31, 32 and the bowl, and the rolling rigidity between the bowl and the tractor due to the nature of the draft hitch 23, the tractor is positioned about its roll axis 76, that is to say, is positioned as to lateral tilting, in accordance with the position of the bowl. since the bowl, particularly when filled, is weighty and relatively ponderous, it tends to resist lateral tilting or swaying movement, so that the tilting movement which is imparted to the tractor, and hence to the cab of the tractor, is minimized. Thus, the cab remains relatively stable subjecting the operator to a minimum of lateral accelerational forces while the tractor wheels are, at the same time, free to follow variations in ground contour at an unopposed and relatively rapid rate.

In accordance with the present invention, the tractor section 21 and scraper section 22 are so proportioned in size and weight that the weight applied to the scraper wheels under the loaded and unloaded conditions is approximately twice the weight applied to the tractor wheels and the drive systems are so proportioned that the power applied to the scraper wheels is approximately twice the power applied to the tractor wheels. More specifically in accordance with the invention, the prime mover in the scraper section is coupled to the rear wheels axle by a torque converter and has a synchronous link to the motor in the tractor section which is, in turn, connected to the tractor axle by a second torque converter. Still more specifically in accordance with the invention, the synchronous link includes an AC synchronous generator and induction motor, the generator being permanently connected to one another by a set of electrical transmission lines.

As illustrated in FIG. 1, the generator, indicated at 120, is preferably sandwiched between the prime mover 110 and the hydraulic coupling 111. And as shown in more detail in FIG. 9, the alternator 120 includes a stator or armature 121 and a rotor 122 having a field coil 123 fed by slip rings 124, 125. The slip rings are connected to a power source here shown in the form of battery 126 having a rheostat 127 in series therewith for varying the exitation. Interconnecting the alternator 120 and induction motor 51 are a set of transmission lines 130 consisting of three-phase lines 131–133. Such lines are connected to the stator winding 134 of the motor to produce a rotating field driving the armature 135 at near-synchronous speed.

In the form of the invention shown in FIG. 9, means are provided for constantly measuring the power applied to the rear or scraper wheels of the assembly and for measuring the power applied to the front or tractor wheels, and for varying the generator exitation to establish a ratio therebetween of 2:1 so that the power applied to the motor 51, and the tractor wheels, tends constantly to be one-half of the power applied to the scraper wheels. Thus there is interposed ahead of the scraper wheels 31, 32, and downstream from the primer mover 110, a scraper wheel power measurement device 141. The invention is not limited to any specific device for measuring the power applied to the scraper wheels. Such device may, for example, take the form of a torque monitor for producing an output signal proportional to torque, a tachometer for producing an output signal proportional to speed, plus known means for constantly producing a resultant output signal which is the product of the two.

Similarly there is provided, in series with the transmission lines 130, a device 142 for measuring the power flowing to the motor 51. Here again, the invention is not limited to any particular type of measuring means and any known device will suffice which produces an output signal which is a product of the voltage and the in-phase component of the currents in the respective lines. Signals representative of the respective powers thus appear on lines 143, 144 leading from the power measuring devices. Next, means are provided for establishing a 2:1 ratio between the powers. This is conveniently achieved by providing a device 145 which on a continuing or repetitive basis divides the scraper power signal by a factor of 2 to produce a quotient output signal on line 146. The signals on lines 146, 144 are then fed to a suitable comparator 147, known in the art, having output lines 148 which are selectively energized depending upon the direction of unbalance of the two signals. The output lines control an adjusting motor 150 of the reversible type having a mechanical follow-up connection 151 with the rheostat 127.

It will be apparent to one skilled to one skilled in the art that, in operation, the motor 150 is de-energized as long as the power supplied to the drive motor 51 in the tractor section is half of the power being supplied to the scraper wheels. However, should the power supplied to the motor 51 depart from the 2:1 ratio, the adjusting motor 150 is energized to drive the rheostat 127 correctively in a direction to re-establish the desired power ratio. To overcome any tendency toward hunting the comparator may have a central dead band. It will be apparent, of course, that a somewhat more sophisticated follow-up circuit may be used in a commercial embodiment of the invention, but the above diagram (FIG. 9) is intended to simplify understanding of the inventive contribution. One of the advantages of this type of control is that use of torque changers becomes optional.

The present invention is applicable to push-loaded scrapers as well as to scrapers employing an elevator 39. In the illustrated elevator-type scraper the elevator is driven by a motor 160 under the control of switch gear 161. In the present instance the switch gear 161, in its simplest aspect consists of a set of switches for tapping in on the lines upstream from the power measuring device 142. The elevator motor, similarly to the tractor motor 51, is of the electric induction type operating at near synchronous speed so that the elevator speed will automatically tend to be related to the speed of the vehicle.

It is preferred, in the interest of simplicity and economy in practicing the invention, for the alternator 120 and tractor motor 51 to be permanently interconnected by the multi-phase transmission lines 130. By "permanently connected" is meant that the connections need not be changes for pole-switching or the like during normal operation. Elimination of switchgear between generator and motor for pole switching or similar purpose serves to avoid troublesome maintenance problems.

In practicing the invention the alternator 120 and motor 51 may have the same number of poles. However, it is preferred that the motor have a lesser but even number of poles (say, 8 versus 10) so that the motor operates at a higher synchronous speed than the alternator, an appropriate speed reduction being obtained in the tractor transmission 53 so that the wheels of the vehicle are all driven at the same peripheral speed. Utilizing a motor 51 of higher synchronous speed enables the necessary power to be obtained with a saving in the size and weight of the tractor motor and drive train.

Achieving the ratio of 2:1 in axle loading, with two-thirds of the total weight on the rear wheels and one-third on the front, once it is recognized as a significant design criterion, is readily achieved. It is achieved, first of all, by making the tractor section components relatively light and of smaller size as already discussed. It is achieved in addition by making the scraper section components, and particularly the drive therefore, relatively heavier and in proportion to the concentration of power at the rear end of the vehicle. Beyond this, the weight distribution may be "fine tuned" by placement of the axles with respect to the remainder of the structure; moving the rear axle forwardly with respect to the scraper section and the front axle forwardly with respect to the tractor section will tend to weight the rear axle while unloading the front. By placing the bowl in appropriate relation to the axles, the payload is divided in accordance with the same 2:1 relation. One skilled in the art should, in any event, have no difficulty in achieving, at least approximately, the weight distribution characterizing the present invention.

Figure 10:
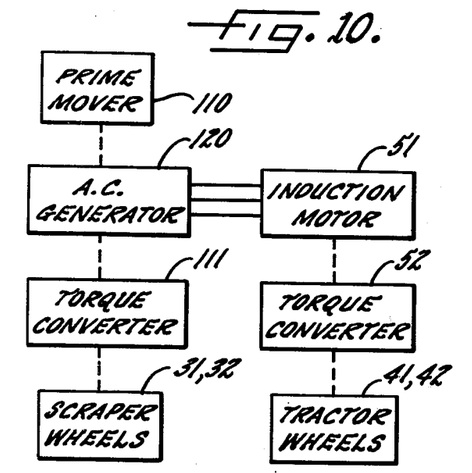
FIG. 10 is a block diagram showing the system in a preferred simplified form.

While the desired 2:1 ratio at the scraper and tractor wheels may be affirmatively and continuously maintained by the control system of FIG. 9, the invention is preferably employed in a more simplified form by omitting the measuring and follow-up control means of FIG. 9 and by relying instead upon use of torque converters 52, 111 having predetermined maximum horsepower output ratings at input speeds corresponding to normal operating prime mover r.p.m. which substantially total the maximum rated horsepower produced by the prime mover at such r.p.m. and which bear a ratio to one another on the general order of 2:1. The procedure for bringing about the desired division of horsepower may be understood by referring to the block diagram in FIG. 10 and to typical prime mover and torque converter characteristic curves shown in FIG. 11.

Figure 11:
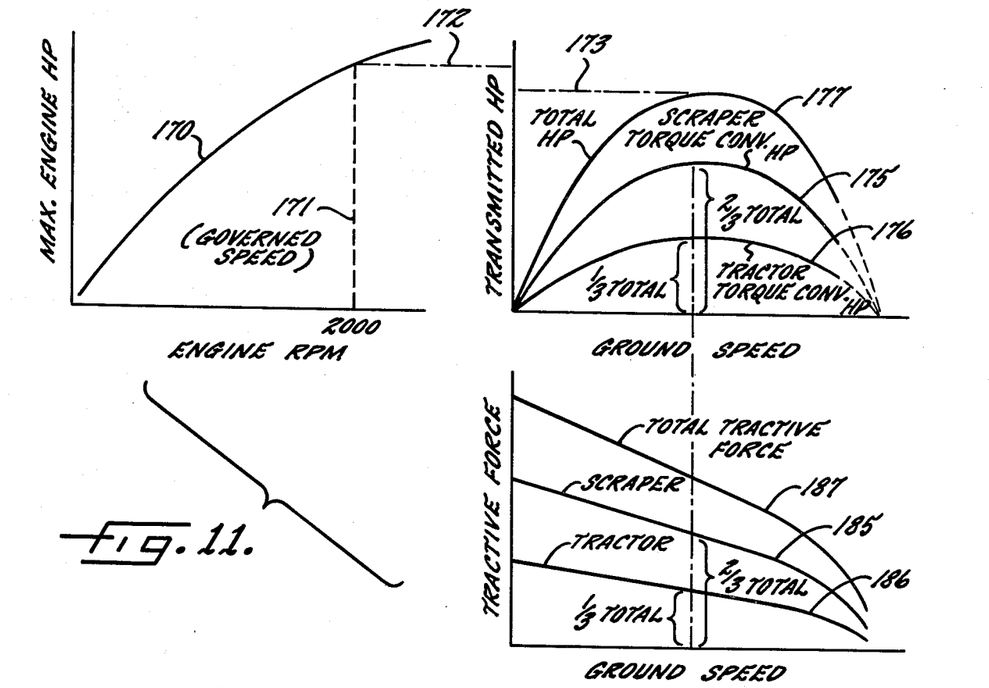
FIG. 11 is a set of three inter-related characteristics showing the desired relation between the maximum horsepower output ratings of the torque converters at the scraper and tractor axles, respectively.

It will be assumed that the engine has a speed-torque characteristic 170 and a normal governed operating speed 171 to produce substantially full rated output as indicated at 172. This corresponds to a total power 173 at the output of the torque converters, which is at a slightly lower level because of losses, say, ten percent, in the torque converters. The speed-horsepower characteristics of the torque converters 111, 52 are indicated at 175, 176 respectively, both being related to ground speed. In carrying out the invention the torque converters 111, 52 are so chosen that their maximum horsepower output ratings at input speeds corresponding to the normal governed operating speed of the prime mover, upon being added together, come to a total which approximately equal maximum rated engine horsepower at the governed speed. The envelope of total transmitted horsepower, being the sum of 175,176, is shown at 177. Secondly, the torque converters are chosen so that their respective maximum horsepower output ratings bear a ratio to one another on the general order of 2:1. It will be noted, because of the generally symmetrical shape and shallow curvature of the horsepower-ground speed curves, that the 2:1 ratio is substantially preserved over a wide range of ground speed.

Because the transmitted horsepower for the torque converters have both been related to ground speed, it is apparent that, short of slippage, the tractive forces produced at the wheels by the respective torque converters are in the same ratio. Referring to the plot of tractive force as a function of ground speed, it will be noted that the tractive force 185 at the scraper, added to the tractive force 186 at the tractor results in a total tractive force 187 and that the component tractive forces 185, 186 are in a 2:1 ratio over a substantial range of ground speed. It is seen then, that by using torque converters having characteristics which are in accordance with the present teachings, it is possible to achieve and automatically maintain the desired 2:1 power and traction ratio at the scraper and the tractor wheels respectively without resort to servo type control systems.

Figure 12:
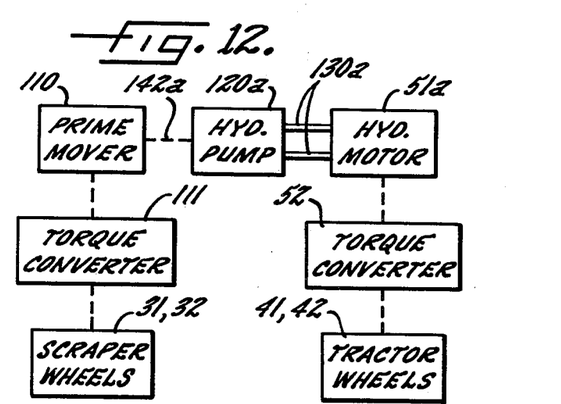
FIG. 12 is a schematic diagram showing substitution of an hydraulic type of synchronous link.

It is one of the features of the above system that there exists a "synchronous link" between the prime mover and the tractor drive motor. That is to say, using a synchronous AC generator and low slip induction motor, connected by three-phase transmission lines, the speed of the tractor will always be substantially proportional to the speed of the prime mover. The invention is, however, not limited to use of an alternator and induction motor, but, if desired, the synchronous link may be replaced by a positive displacement type hydraulic pump at the engine and positive displacement hydraulic motor at the tractor axle interconnected by flexible hydraulic transmission lines. Such an arrangement is shown in FIG. 12 where the pump 120a is connected by hydraulic lines 130a to hydraulic motor 51a, the hydraulic system including a conventional sump or reservoir (not shown). The hydraulic motor 51a is comparable, in most respects, to an electric induction motor and may be even lighter in weight, so that the system of FIG. 12 provides the same features and advantages as discussed. Accordingly, the term "generator" as used herein is intended to be interpreted generically to include an hydraulic pump and the term "transmission lines" accordingly includes hydraulic as well as electrical lines.

Figure 13:
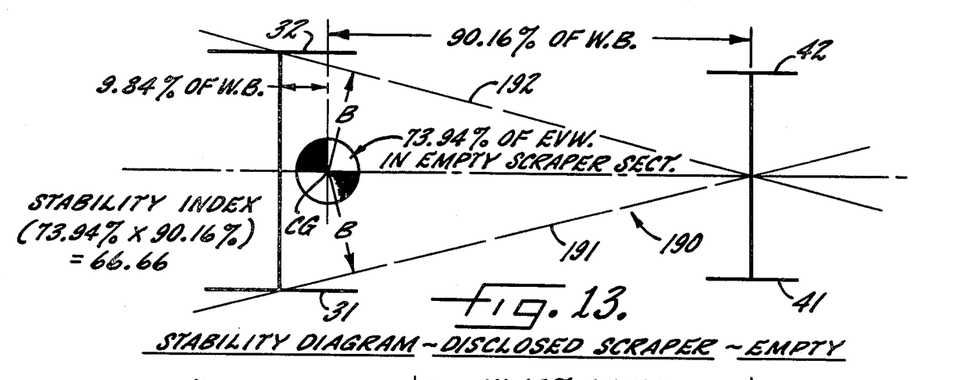
FIG. 13 is a stability diagram for the disclosed scraper in empty condition.

The improvement in stability brought about by the present invention, for the empty bowl condition, is well illustrated by the diagrams set forth in FIGS. 11 and 12, respectively, applicable to a prototype design utilizing the invention as compared to a more conventional design. There is shown, at 190 in FIG. 13, the plan view of a typical inventive scraper of practical design having base or "tipping" lines 191, 192, respectively, and with a center of gravity CG, where 73.94 percent of the empty vehicle weight is concentrated at a point corresponding to 90.16 percent of the wheel base. Multiplying the two figures together gives a stability index of 66.66. Such stability index has significance since the stability depends upon two factors, the total amount of weight and the point at which it is applied. The point of application should preferably be far to the rear, thereby increasing the dimension B, which is the amount that the center of gravity must laterally shift in order to provide a net overturning moment about a tipping line.

Figure 14:
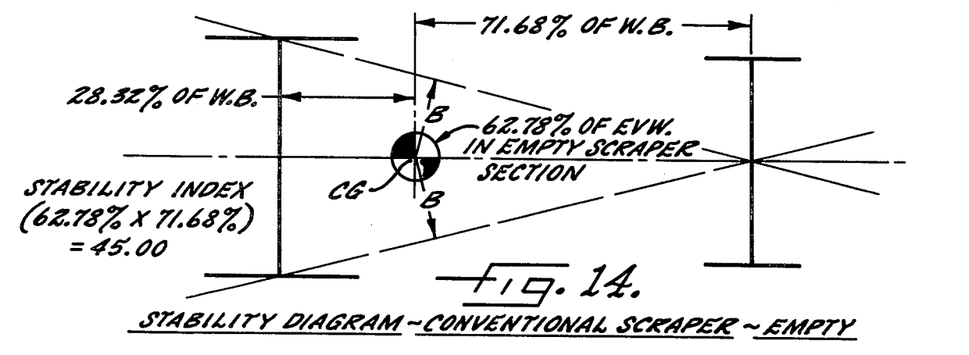
FIG. 14 is a diagram similar to FIG. 13 but applicable to a conventional scraper, also in empty condition.

Referring next to FIG. 14 which indicates a more conventional weight distribution, 62.78 percent of the empty vehicle weight is concentrated at CG, a point which is located at only 71.68 percent of the wheel base resulting in less hold-down force combined with a substantially reduced dimension B which, upon being exceeded, results in overturning. The two percentages, when multiplied together, produce a stability index of only 45.00.

Figure 15:
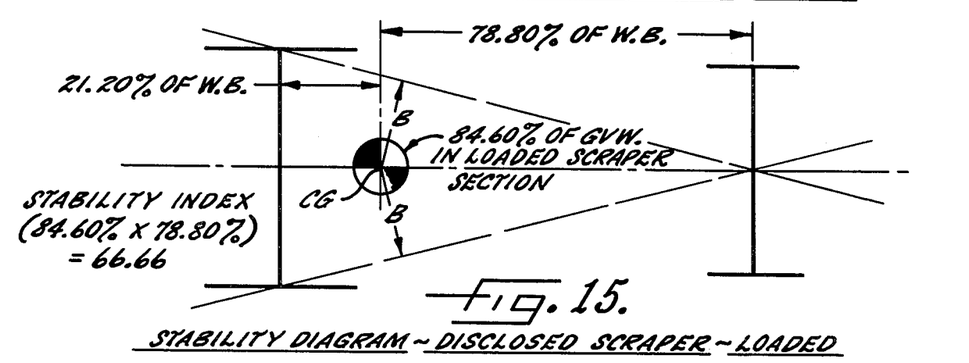
FIGS. 15 and 16 are diagrams corresponding to those in FIGS. 13 and 14 but for the loaded condition.
Figure 16:
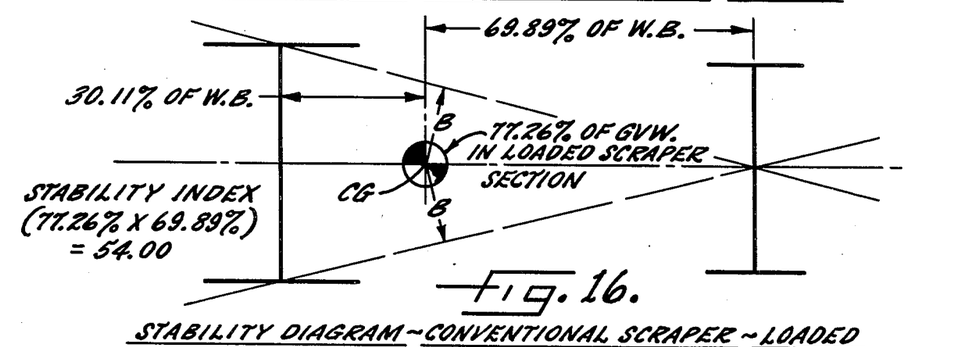

Turning next to FIG. 15 which shows an equivalent diagram for the disclosed scraper loaded condition, 84.60 percent of the loaded vehicle weight is applied at a point which is 78.80 percent of the wheel base, resulting in a stability index of 66.66, substantially the same as before. Comparing this with a more conventional loaded vehicle as shown in FIG. 16 where 77.26 percent of the loaded vehicle weight is applied at a point which is 69.89 percent of the wheel base a stability index of 54.00 is produced which, although an improvement upon the empty condition, is still substantially less than the stability achieved by the invention. Indeed, it is the relative improvement under the empty condition which is the more significant in view of the tendency of an operator to traverse rougher ground at high speed in the unloaded condition.

In the preferred form of the invention including an alternator-induction motor link for driving the tractor wheels at a power level of one-half that of the wheels of the scraper section, the advantages of the invention are fully realized. All elements of the tractor may be appropriately down-sized resulting in the numerous advantages set forth in the objects of the invention listed above. Since the tractor driving motor weighs only a small fraction of the weight of the large engine conventionally employed at the tractor position, this has the desirable effect of shifting weight to the rear wheels. The generator necessary to drive the motor, and its location immediately above the rear axle, adds loading to the rear wheels, as does the use of a larger engine at this position. Driving the vehicle primarily at the rear wheels permits a tractor section which is more economical, compact and functionally efficient. Contributing to efficiency is the fact that the power is concentrated more nearly at the location of the pay load. Control is highly simplified to the extent that the generator and motor may be permanently coupled by their transmission lines without resorting to interposed pole-switching gear to cover the required range of speed and torque, thereby overcoming the maintenance and reliability problems associated with pole-switching and the like. The only switch gear required is that indicated at 161 for diverting power to the elevator drive motor 160. The operator's environment is vastly improved, with the hum of a relatively small motor being substituted for the noise, vibration, heat and fumes of a conventional cab-mounted engine. Visibility is improved and rolling discomfort is greatly alleviated.

While we have found that two-thirds of the weight and power should be concentrated at the rear axle with one one-third at the front, it will be apparent to one skilled in the art that it is possible to achieve the main benefits of the invention within a permissible range on each side of the optimum condition. Thus, it has been found that the weight and power at the rear axle may, within the scope of the invention, vary between, say, 60 and 72 percent of the total weight and power and the weight and power applied at the front axle may range between, say, 40 and 28 percent of the total weight and power.

The drive system constructed in accordance with the present invention is intended to operate as described, and with powers in the prescribed ratio, under normally difficult earth moving conditions. The system is, however, flexible in that under easy soil conditions the tractor transmission may be put in neutral and the power which would normally flow thereto may, by switch 161, be directed instead to the elevator motor.

What we claim is:

1. In an off-highway earth-moving vehicle of the scraper type, the combination comprising, a tractor section and a scraper section, the scraper section having a scraper blade and a bowl, each section having a pair of ground-engaging wheels, a draft frame providing rolling rigidity interposed between the sections, the tractor section having an axle assembly mounting the associated wheels and which is floatingly supported with respect to the tractor section to permit independent movement of the assembly in the following of ground contours, the sections of the vehicle being so proportioned in size and weight that the weight applied to the scraper wheels under both loaded and unloaded conditions is approximately twice the weight applied to the tractor wheels, a prime mover in the scraper section having a torque converter for coupling to the scraper wheels and having a generator, means for governing the prime mover for operation at a normal operating r.p.m., a motor in the tractor having a torque converter for coupling to the tractor wheels, the generator and motor being synchronously linked so that the motor continuously operates at a speed which is substantially proportional to that of the prime mover, the scraper and tractor torque converters having respective maximum horsepower output ratings at input speeds corresponding to normal operating prime mover r.p.m. which substantially total the maximum rated horsepower produced at such r.p.m. and which bear a ratio to one another on the general order of 2:1.

2. In an off-highway earth-moving vehicle of the scraper type, the combination comprising, a tractor section and a scraper section, the scraper section having a scraper blade and a bowl, each section having a pair of ground-engaging wheels, a draft frame providing rolling rigidity interposed between the sections, the tractor section having an axle assembly mounting the associated wheels and which is floatingly supported with respect to the tractor section to permit independent movement of the assembly in the following of ground contours, the sections of the vehicle being so proportioned in size and weight that the weight applied to the scraper wheels under both loaded and unloaded conditions is approximately twice the weight applied to the tractor wheels, a prime mover in the scraper section coupled to the scraper wheels and having a generator, means for governing the prime mover for operation at a normal operating r.p.m., a motor in the tractor coupled to the tractor wheels, the generator and the motor being synchronously linked so that the motor continuously operates at a speed which is substantially proportional to the speed of the prime mover, and means for maintaining the horsepower applied to the scraper wheels at a ratio on the general order of 2:1 with respect to the horsepower applied to the tractor wheels.

3. In an off-highway earth-moving vehicle of the scraper type, the combination comprising, a tractor section and a scraper section, the scraper section having a scraper blade and a bowl, each section having a pair of ground-engaging wheels, a draft frame providing rolling rigidity interposed between the sections, the tractor section having an axle assembly mounting the associated wheels and which is floatingly supported with respect to the tractor section to permit independent movement of the assembly in the following of ground contours, the sections of the vehicle being so proportioned in size and weight that the weight applied to the scraper wheels under both loaded and unloaded conditions is approximately twice the weight applied to the tractor wheels, a prime mover in the scraper section having a torque converter for coupling to the scraper wheels, means for governing the prime mover for operation at a normal operating r.p.m., an AC synchronous generator in the scraper section directly coupled to the prime mover, an induction motor in the tractor having a torque converter for coupling to the tractor wheels, a set of three phase electrical transmission lines between the generator and the motor forming a synchronous link so that the motor continuously operates at a speed which is substantially proportional to the speed of the prime mover, the scraper and tractor torque converters having respective maximum horsepower output ratings at input speeds corresponding to the normal operating prime mover r.p.m. which substantially total the the maximum rated horsepower produced at such r.p.m. and which have a ratio to one another on the general order of 2:1.

4. The combination as claimed in claim 1 or claim 2 or claim 3 in which the weight and power applied to the scraper wheels range between 60 and 72 percent of the total weight and power, and the weight and power applied to the tractor wheels range between 40 and 28 percent of the total weight and power.

5. The combination as claimed in claim 3, the induction motor having an even number of poles less than the number of poles of the alternator so that it operates at a higher synchronous speed than the alternator.

6. The combination as claimed in claim 1 in which the generator is in the form of an hydraulic pump and in which the motor is in the form of an hydraulic motor powered by the pump.

7. The combination as claimed in claim 2 including means for continuously measuring a first power being supplied to the scraper wheels, means for continuously measuring a second power supplied to the tractor wheels, and means for automatically and continuously adjusting at least one of the powers to maintain the first power at a level which is substantially twice the second.

8. The combination as claimed in claim 2 including means for continuously developing a first control signal representative of a first power being supplied to the scraper wheels, means for continuously developing a second signal representative of a second power being applied to the tractor wheels, means for comparing the control signals and for producing an output signal indicative of the ratio between them, and means responsive to the output signal for correctively adjusting the second power for maintaining it constantly at a level which is approximately one-half of the first power.

9. The combination as claimed in claim 3 in which the scraper is provided with an elevator having an induction motor, and switch means for optionally connecting the induction motor to the transmission lines.

* * * * *